April 2, 1940.  E. W. FIELDS  2,195,954
CONTROL SYSTEM
Filed July 7, 1937

Elmer W. Fields
INVENTOR
BY Victor J. Evans & Co.
ATTORNEYS

Patented Apr. 2, 1940

2,195,954

UNITED STATES PATENT OFFICE 2,195,954

CONTROL SYSTEM

Elmer W. Fields, Columbus, Ohio

Application July 7, 1937, Serial No. 152,441

1 Claim. (Cl. 236—1)

The invention relates to an electric heating and ventilating system and more especially to an automatically operated electric heating and ventilating apparatus for closed motor vehicles.

The primary object of the invention is the provision of an apparatus of this character, wherein an electric heater and an electric fan are independently operative so that the interior of a closed type of motor vehicle can be heated during cold weather and ventilated during warm weather, the heater and the fan being automatically controlled under the influence of a thermostat so that when the vehicle becomes heated to a determined degree the heater circuit will be caused to automatically open and simultaneously the fan circuit, which during the operation of the heater is open, will be closed for the working of the latter and vice versa on the temperature within the vehicle dropping below a determined degree the fan circuit will be opened and the heater circuit closed, thereby enabling the heating and ventilating of a motor vehicle automatically for assuring comfort to the user of such vehicle during warm and cold weather.

Another object of the invention is the provision of an apparatus of this character, which is extremely simple in its construction, thoroughly reliable and efficient in operation, automatically acting, durable, and inexpensive to manufacture and install.

With these and other objects in view, the invention consists in the features of construction, combination and arrangement of parts as will be hereinafter more fully described, illustrated in the accompanying drawing, which discloses the preferred and modified forms of embodiment of the invention and pointed out in the claim hereunto appended.

In the accompanying drawing.

Similar reference characters indicate corresponding parts throughout the several views in the drawing.

Figure 1:
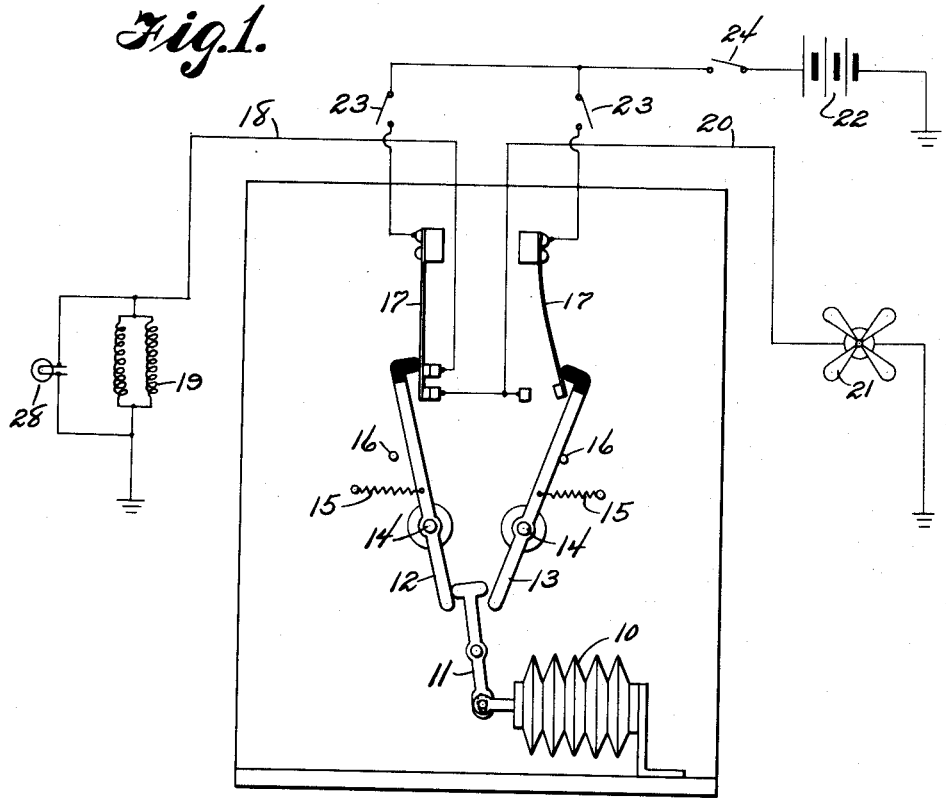
Figure 1 is a diagrammatic plan view of a preferred embodiment of the system or apparatus in accordance with the invention.

Referring to the drawing in detail, the apparatus comprises a bellows type thermostat 10 having connection with a rocking arm 11 arranged between and operating alternately opposite pivotally supported switch closing levers 12 and 13, respectively, the pivot therefor being indicated at 14 while active upon the lever are coiled retractile springs 15 which urge the same to a rest position against stops 16. These levers 12 and 13 function for closing alternately a pair of switches 17, one being arranged in an electric heater circuit 18 including therein an electric heater 19 and the other arranged in an electric fan circuit 20 including therein an electric fan 21.

The circuits 18 and 20 are in electrical connection with a storage battery 22 which is the electric power source of supply and also included in these circuits are hand operated switches 23 while included in the connections between the said circuits and the battery 22 is a main hand switch 24. Thus by the opening manually of the switch 24 the battery 22 will be cut off from the circuits 18 and 20, then by operating the switch 23 in either of the circuits 18 and 20 when the switch 24 has been closed will open or close either of said circuits 18 or 20.

Assuming that the circuit 18 having the heater 19 therein is closed to the battery 22 and likewise the circuit 20 having the fan 21 is closed to the said battery but the switch 17 in the circuit 20 is open while the switch 17 in the circuit 18 has been automatically closed under the working of the thermostat 10 the electric heater 19 will be active for heating purposes. Now when the heat from this heater 19 exceeds a determined degree the thermostat 10 operates to allow the switch 17 in the circuit 18 to open and simultaneously the switch 17 in the circuit 20 will be closed, the opening of the switch in the circuit 18 shuts off the heater 19 and the closing of the switch 17 in the circuit 20 starts the fan 21 in its operation. When the temperature drops below a determined degree, the fan 21 automatically is stopped under the action of the thermostat 10 opening the switch 17 in its circuit 20 and simultaneously the switch 17 in the circuit 18 will become closed whereupon the heater 19 operates.

Figure 2:
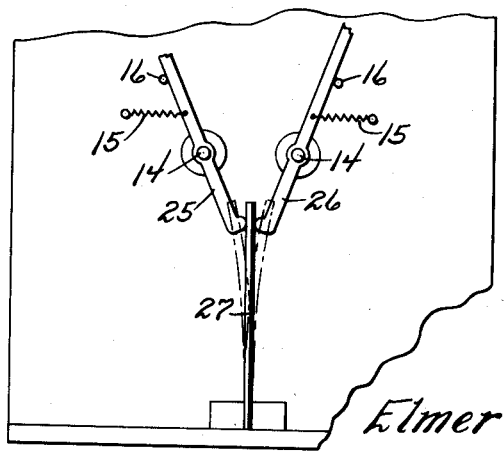
Figure 2 is a fragmentary plan view of a slight modification.

In Figure 2 of the drawing there is shown a slight modification wherein the levers 25 and 26, respectively, having arranged therebetween and operative thereon a bi-metal rod-like thermostat 27 which is effected by temperature changes for flexing or bending in the alternate working of the levers 25 and 26 corresponding to the alternate action of the levers 12 and 13 before described.

Arranged in the circuit 18 having the heater 19 and in parallel with the circuit is an electric lamp 28 which, when the heater is on, illuminates showing the working of such heater.

What is claimed is:

In a structure of the kind described having a heating device and a circulating device, a changeover switch for selectively putting alternately either or both devices into service and involving normally opened alternately closeable springy contacts disposed opposite each other, a pair of opposed swinging levers having insulated terminals active against the contacts for alternately operating the same, springs connected with the levers for holding the same in spread relation to each other, a rocking arm having a cross head swingable between the levers and alternately engageable therewith for actuating the same, and a thermostatic device having connection with the said arm for movement thereof under temperature changes.

ELMER W. FIELDS.